3,513,169
5,9-DIETHYL BENZOMORPHAN DERIVATIVES

Franklin M. Robinson, Ambler, Paul S. Anderson, North Wales, and James A. Nicholson, Philadelphia, Pa., assignors to Merck & Co., Inc., Rahway, N.J., a corporation of New Jersey
No Drawing. Filed May 20, 1966, Ser. No. 551,546
Int. Cl. C07d 39/00
U.S. Cl. 260—294.7                                      6 Claims

ABSTRACT OF THE DISCLOSURE

Novel 5,9-diethyl benzomorphan derivatives and processes for preparing the same are described. These compounds exhibit good pharmacological properties as analgesics.

---

This invention relates to novel benzomorphan derivatives which have pronounced analgesic activity. More specifically this invention relates to 5,9-diethyl-2′-hydroxy-2-substituted-6,7-benzomorphan derivatives and processes for the preparation of the same.

The 5,9 - diethyl-2′-hydroxy-2-substituted-6,7 - benzomorphan derivatives of this invention have pronounced analgesic or pain relieving activity coupled with the highly desirous property of being non-addicting and non-narcotic.

The 5,9-diethyl benzomorphans of this invention show little activity in the standard rat tail flick or rat tail pinch test, thus indicating either no addicting properties or a low order of addition liability, since there is a direct correlation between increased addiction liability and increased activity in the above-identified tests. On the other hand, the benzomorphan derivatives of this invention show good acitivity in a modified Randall-Selitto test. Good activity in this test would indicate useful analgesic activity in this test would indicate useful analgesic activity since cyclazocine and pentazocine, two known analgesics, show activity in this test and additionally are known to have low addiction liability.

The benzomorphan derivatives of this invention generally have minimal side effects and minimal toxicity and many of them have little or no narcotic antagonist activity. The lack of narcotic antagonist activity can be advantageous because of the observation that high antagonist activity has generally been associated with undesirable side effects.

A further feature of this invention resides in the fact that the compounds of this invention can be produced by synthetic means more conveniently than are members of the morphine family of naturally occurring alkaloidal analgesics.

The compounds of this invention are administered orally or subcutaneously, preferably as an aqueous solution of the hydrochloride salt and in the range of about .001 mg./kg. to about 18 mg./kg. The compounds also have a favorable therapeutic ratio.

It is an object of this invention to provide novel 5,9-diethyl - 2′-hydroxy-2-substituted-6,7-benzomorphan derivatives having analgesic properties and being substantially devoid of addicting properties as well as processes for their preparation.

The compounds of this invention can be represented by the following structural formula:

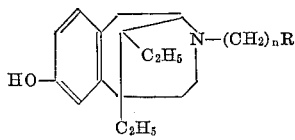

Structure I wherein R represents cycloalkenyl, spiroalkyl, alkyl substituted cycloalkenyl, alkenyloxy-alkyl and alkoxyalkyl when $n$ equals the integer 1 and R represents cycloalkyl when $n$ is 0; $n$ thus representing an integer selected from 0 or 1.

Included in this invention are the isomers of the above-noted structures in which the two ethyl groups are in cis relationship to each other which are also referred to in this application as the normal or α isomers.

The cis isomer discussed above can be separated into its optical isomers [dextro (+) and levo (−)] by preparing the diasteroisomeric salts with optically active acids either $d$ (+) or $l$ (−), which salts can then be separated by fractional crystallization.

Prior to our invention, it had generally been known that levorotatory (−) isomers of benzomorphan compounds possessed substantially all the desired analgesic activity exhibited by the mixture of isomers whereas the dextro (+) isomer possessed little or no analgesic activity. We surprisingly found, however, that the dextro (+) isomers of many of the novel 5,9-diethyl-2′-hydroxy-2-substituted-6,7-benzomorphans of our invention possess analgesic and other desirable properties discussed above contrary to what is generally known concerning the inactivity of these isomers. Thus, it is to be understood that included in this invention along with the novel 5,9-diethyl-2′-hydroxy-2-substituted-6,7-benzomorphan derivatives are the individual optical isomers, that is the dextrorotatory (+) as well as the levorotatory (−) isomers of our novel benzomorphan compounds.

Although all the compounds described above have analgesic activity, the preferred compounds of this invention are those wherein R in Structure I is a lower cycloalkyl advantageously having from 3 to 6 carbon atoms when $n=0$, and wherein the alkoxy-alkyl and alkenyloxy-alkyl radicals are lower (alkoxy-alkyl) and lower (alkenyl-oxy-alkyl) having a total of from 2 to 6 carbons, such as, for example, β-ethoxy-methyl, n-butoxy-methyl, β-vinyl-oxy-ethyl and the like.

In addition, when R in Structure I is cycloalkenyl or an alkyl substituted cycloalkenyl, preferred benzomorphan derivatives are those wherein R is a lower cycloalkenyl radical having from 3 to 6 carbon atoms and wherein the alkyl substituent or or substituents are lower alkyl having from 1 to 5 carbon atoms. Other active benzomorphan compounds of this invention are those wherein the spiroalkyl radical in Structure I above is a lower spiroalkyl having from 5 to 7 carbon atoms, such as spirohex-5-yl, spiro-3,3-hept-2-yl radicals and the like.

In a special embodiment of this invention, it has been found that benzomorphan derivatives, such as:

5,9-diethyl-2′-hydroxy-2-(cyclopenten-3-yl-methyl)-6,7 benzomorphan;

5,9-diethyl-2′-hydroxy-2-(2,3,3-trimethylcyclopropenyl-methyl)-6,7-benzomorphan;

5,9-diethyl-2′-hydroxy-2-vinyloxyethyl-6,7-benzomorphan; and 5,9-diethyl-2′-hydroxy-2-(spirohex-5-yl-methyl)-6,7-benzomorphan have good analgesic properties.

The 5,9 - diethyl-2′-hydroxy-2-substituted-6,7-benzomorphans of this invention can be used as such or in the form of their non-toxic, pharmaceutically acceptable acid addition salts. Such salts are prepared from suitable acids such as inorganic acids as hydrochloric or sulfuric acid, or organic acids, as acetic or maleic acid and the like. The acid addition salts are prepared by reacting the base with approximately one equivalent of the selected acid in an organic solvent such as diethyl ether or alcohol.

The 5,9-diethyl-2′-hydroxy - 2 - substituted-6,7-benzomorphans of this invention can be prepared by one or more of the following processes. One method especially suitable for the preparation of compounds of Structure I where R is alkoxy-alkyl or alkenyloxy-alkyl and $n$ is the integer 1, involves an N-substitution which comprises heating 5,9-diethyl-2'-hydroxy-6,7-benzomorphan with a reactive halide, tosylate or sulfonate or the formula $RCH_2X$, (wherein X is halo, tosyl or other reactive sulfonyl groups, and R is as defined above for Structure I, particularly, however, when R is alkoxy-alkyl or alkenoxy-alkyl and $n=1$) in a water miscible solvent such as dimethylformamide or an alkanol such as ethanol at a temperature of between about 70° C. to 120° C. in the presence of an alkali metal carbonate such as sodium or potassium bicarbonate.

Another method for the preparation of the benzomorphan derivatives of this invention involves the reaction of 5,9-diethyl-2'-hydroxy-6,7-benzomorphan with two equivalents of an acid halide of the formula $RCOX_1$ (wherein $X_1$ is chloride or bromide, and R is as defined above for Structure I, particularly, however, when R is spiroalkyl and when $n=1$) in an inert solvent such as chloroform or benzene and preferably in the presence of a tertiary amine base such as pyridine or triethylamine to form the corresponding 5,9-diethyl-2'-acyloxy-2-acyl-6,7-benzomorphan derivative

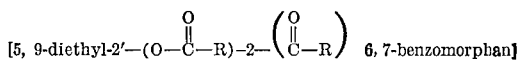

wherein R is as defined above]. Reduction of these derivatives, for instance with lithium aluminum hydride in diethyl ether or tetrahydrofuran, gives the biologically active compounds of this invention.

A third and especially suitable method for the preparation of the 5,9-diethyl-2'-hydroxy-2-substituted-6,7-benzomorphans of the present invention (wherein the N-substituent is $CH_2R$) involves reacting 5,9-diethyl-2'-hydroxy-6,7-benzomorphan with two equivalents of a mixed anhydride of the formula

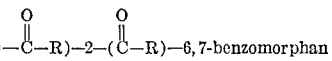

(wherein R is as defined below and $R_1$ is lower alkyl) to form the 2-acyl-2'-acyloxy derivative

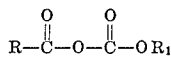

followed again by reduction with lithium aluminum hydride in an appropriate solvent such as ethyl ether or tetrahydrofuran to form the desired compounds. The mixed anhydride in the latter reaction is usually prepared in situ by the reaction on an appropriate tertiary amine (such as triethylamine) salt of an acid of the formula

(wherein R is as defined above for Structure I, particularly however, when R is cycloalkenyl, alkyl substituted cycloalkenyl and spiroalkyl when $n=1$) with a lower alkyl chloroformate, preferably ethyl chloroformate or isobutyl chloroformate, in an inert solvent such as chloroform.

The reaction above between the benzomorphan and the mixed anhydride must sometimes be carried out at low temperatures preferably between −30° C. to 0° C.

A preferred method for preparing 5,9-diethyl-2'-hydroxy-6,7-benzomorphans which are 2-substituted with a cycloalkyl group having from 4 to 6 carbon atoms (R is cycloalkyl and $n=0$ in Structure I), involves the reaction of the 5,9-diethyl-2'-hydroxy-6,7-benzomorphan with a cyclic ketone in an appropriate inert solvent such as benzene or toluene and in the presence of catalytic amounts of a strong acid and molecular sieves at the boiling point of the solvent. Water is removed by azeotropic distillation to produce an enamine which subsequently is reduced, preferably by catalytic hydrogenation, in the presence of a noble metal catalyst, such as palladium-on-carbon, to produce the 2-cycloalkyl derivative. A procedure for preparing the 5,9-diethyl-2'-hydroxy-2-cyclopropyl-6,7-benzomorphan is shown in detail in Example 8.

In all the above processes, the desired end products are isolated from their particular reaction solutions or mixtures by methods known in the art.

The starting material for the preparation of the novel compounds of this invention, namely, 5,9-diethyl-2'-hydroxy-6,7-benzomorphan is prepared from 5,9-diethyl-2'-hydroxy-2-methyl-6,7-benzomorphan which is a known compound. The preparation of the starting material is preferably performed by acylating 5,9-diethyl-2'-hydroxy-2-methyl-6,7-benzomorphan at the 2'-position with acetic anhydride, heating the acylated compound at elevated temperature with cyanogen bromide in an organic solvent, preferably a halogenated hydrocarbon, for example, chloroform, thereby replacing the 2-methyl group with a cyano group and then removing the cyano and acetyl groups by hydrolysis in a dilute acid solution. A detailed preparation of the starting material is shown in Example 1.

In addition to using the racemic form of the starting material, there may be employed one of its isomeric forms prepared by known methods using a resolving agent such as camphor sulfonic acid, tartaric acid, dibenzoyl tartaric acid and the like to separate the (−) levo and (+) dextro isomers. Each optical isomer of 5,9-diethyl-2'-hydroxy-6,7-benzomorphan can then be used as the starting material in the various examples resulting in (+) dextro or (−) levo 5,9-diethyl-2'-hydroxy-2-substituted-6,7-benzomorphans. Alternatively, the racemic 5,9-diethyl-2'-hydroxy-2-substituted - 6,7 - benzomorphan end products can themselves be resolved according to a procedure similar to that described above, to yield the dextrorotatory (+) and levorotatory (−) isomers of 5,9-diethyl-2'-hydroxy-2-substituted-6,7-benzomorphans.

The following examples illustrate the various methods described above for the preparation of the novel 5,9-diethyl-2'-hydroxy-2-substituted-6,7-benzomorphans of the present invention.

In all of the examples the cis (normal or α) form of the 5,9-diethyl-2'-hydroxy-6,7-benzomorphan is used as the starting material thus yielding the corresponding cis-end product. However, in some instances the dextrorotatory (+) or the levorotatory (−) isomer of cis 5,9-diethyl-2'-hydroxy-6,7-benzomorphan is used as the starting material thus yielding the corresponding dextrorotatory (+) or levorotatory (−) end product. The examples should be construed as illustrations of the invention and not as limitations thereof.

EXAMPLE 1

Preparation of 5,9-diethyl-2'-hydroxy-6,7-benzomorphan from 5,9-diethyl-2'-hydroxy-2-methyl-6,7-benzomorphan Five grams of 5,9-diethyl-2'-hydroxy-2-methyl-6,7-benzomorphan and 8.7 ml. of acetic anhydride are combined and heated on a steam bath for 35 minutes. The clear solution is cooled and poured into 15 ml. of ice and water. This mixture is made alkaline to pH 10–12 with 40% NaOH. The basic mixture is then extracted with chloroform and the chloroform solution washed with water and dried over sodium sulfate. The chloroform is then evaporated to dryness and the residue is dissolved in 37 ml. of dry chloroform. This solution is added over ½ hour to a stirred solution of 6.37 g. of cyanogen bromide dissolved in 37 ml. of chloroform. The reaction mixture is then refluxed for three hours and evaporated to dryness under reduced pressure. The resulting 5,9-diethyl-2'-acetoxy-2-cyano - 6,7 - benzomorphan is treated with 70 ml. of 6% HCl and refluxed for 8 hours. The reaction mixture is cooled, made alkaline to pH 10 with ammonium hydroxide, washed with chloroform and dried over sodium sulfate. The mixture is then concentrated to dryness as above to yield crude 5,9-diethyl-2'-hydroxy-6,7-benzomorphan. After recrystallization from ethanol, the 5,9-diethyl-2'-hydroxy-6,7-benzomorphan has a melting point of 265° C. to 268° C.

Analysis.—Calculated for $C_{16}H_{23}NO$ (percent): C, 78.32; H, 9.45; N, 5.71. Found (percent): C, 78.01; H, 9.28; N, 5.42.

EXAMPLE 2

5,9-diethyl-2'-hydroxy-(2,3,3-trimethylcyclopropenylmethyl)-6,7-benzomorphan 2,3,3-trimethylcyclopropene carboxylic acid (0.252 g.) is dissolved in 5 ml. of chloroform and cooled to 0° C. To this solution is added 0.202 g. of triethylamine and 0.216 g. of ethylchloroformate. At 0° C. a solution of 0.245 g. of 5,9-diethyl-2'-hydroxy-6,7-benzomorphan in 5 ml. of chloroform is added with stirring. The reaction mixture is stirred at 0° C. for 12 hours and then at room temperature for 12 hours. The reaction mixture is then diluted with 25 ml. of chloroform and extracted successively with 15% sulfuric acid, water, 5% sodium bicarbonate and water, and then dried over sodium sulfate. The chloroform solution is evaporated under reduced pressure on a steam bath to yield the appropriate, 5,9-diethyl-2'-acyloxy-2-acyl - 6,7 - benzomorphan as an oil. The oil is dissolved in 12.5 ml. of tetrahydrofuran and this solution is added to a stirred suspension of 0.183 g. of lithium aluminum hydride in 1.9 ml. of tetrahydrofuran. The reaction mixture is refluxed for 3½ hours, cooled and 0.55 ml. of ethyl acetate added carefully followed by 0.9 ml. of water. The mixture is stirred for one hour and a filtering aid added. It is filtered through a pad of a filtering aid. The filter cake is washed with more tetrahydrofuran and the solvent then removed under reduced pressure to yield 5,9-diethyl-2'-hydroxy-2-(2,3,3-trimethypIcyclopropenylmethyl)-6,7 - benzomorphan. This material is dissolved in ether and dry HCl gas bubbled through the solution. The mixture is then dissolved in water and made basic to pH 10 with ammonium hydroxide. The mixture is extracted with ether which is then washed with water and dried over molecular sieves. Dry HCl gas is then bubbled into this solution forming the hydrochloride salt. The hydrochloride salt is filtered, washed with ether and dried. The salt is then dissolved in acetone and upon standing 5,9-diethyl-2'-hydroxy - 2 - (2,3,3-trimethylcyclopropenylmethyl)-6,7-benzomorphan hydrochloride separates from the solution. This material is filtered and recrystallized from acetone.

Analysis.—Calculated for $C_{23}H_{33}NO \cdot H_2O(+HCl)$ (percent): C, 69.85; H, 8.92; N, 3.57. Found (percent): C, 69.49; H, 9.22; N, 3.62.

Following the procedure above but using the starting material shown in Column I in place of 2,3,3-trimethylcyclopropene carboxylic acid, there is produced the corresponding compound shown in Column II.

| I | II |
| --- | --- |
| 2,3-dimethyl-2-cyclopropenecarboxylic acid. | 5,9-diethyl-2'-hydroxy-2-(2,3-dimethyl-cyclopropen-2-yl-methyl)-6,7-benzomorphan. |
| 2-ethyl-2-cyclopropene carboxylic acid. | 5,9-diethyl-2'-hydroxy-2-(2-ethyl-cyclopropen-2-ylmethyl)-6,7-benzomorphan. |
| 2,3-dipentyl-1-cyclopentene carboxylic acid. | 5,9-diethyl-2'-hydroxy-2-(2,3-dipentyl-1-cyclopenten-1-yl-methyl)-6,7-benzomorphan. |

EXAMPLE 3

5,9-diethyl-2'-hydroxy-2-(cyclopenten-1-ylmethyl)-6,7-benzomorphan

Following the procedure of Example 2 but using 0.90 g. of 1-cyclopentene carboxylic acid, 0.81 g. of triethylamine, 0.86 g. of ethylchloroformate, 0.75 g. of 5,9-diethyl-2'-hydroxy-6,7-benzomorphan and 0.7 g. of lithium aluminum hydride in 150 ml. of dry ethyl ether, there is produced crude 5,9-diethyl-2'-hydroxy-2-(cyclopenten-1-ylmethyl)-6,7-benzomorphan. The crude 5,9-diethyl-2'-hydroxy-2-(cyclopenten-1-ylmethyl)-6,7 - benzomorphan is then converted to the hydrochloride salt according to a procedure similar to that shown in Example 2. Recrystallization of the crude 5,9-diethyl-2'-hydroxy-2-(cyclopenten - 1 - ylmethyl) - 6,7 - benzomorphan hydrochloride from isopropanol-ethyl-acetate yields pure 5,9-diethyl-2'-hydroxy-2-(cyclopenten-1-ylmethyl) - 6,7 - benzomorphan hydrochloride having a melting point of 231° C. to 233° C.

Analysis.—Calculated for $C_{22}H_{32}NOCl$ (percent): C, 73.01; H, 8.91; N, 3.87. Found (percent): C, 72.36; H, 8.97; N, 3.87.

EXAMPLE 4

5,9-diethyl-2'-hydroxy-2-(3,3-dimethyl)-1-cyclobutenylmethyl)-6,7-benbomorphan hydrochloride Following the procedure of Example 2, but using 1.01 g. of 3,3-dimethyl-1-cyclobutene carboxylic acid, 0.808 g. of triethylamine, 0.87 g. of ethyl chloroformate, 0.75 g. of 5,9-diethyl-2'-hydroxy-6,7-benzomorphan and reducing the 5,9-diethyl-2'-acyloxy-2-acyl-6,7-benzomorphan formed with lithium aluminum hydride, there is produced crude 5,9-diethyl-2'-hydroxy-2-(3,3-dimethyl-1-cyclobutenylmethyl)-67-benzomorphan. The hydrochloride salt is then prepared according to a procedure similar to that shown in Example 2 also.

Analysis.—Calculated for $C_{23}H_{33}NO(H_2O)$ (HCl) (percent): C, 70.11; H, 9.21. Found (percent): C, 70.38; H, 9.49.

Following the procedure above, but using the starting material shown in Column I in place of 1-cyclopentene carboxylic acid or 3,3-dimethyl-1-cyclopentene carboxylic acid (as in Example 3) respectively, there is produced the corresponding compound shown in Column II.

| I | II |
| --- | --- |
| 3-cyclopentene carboxylic acid | 5,9-diethyl-2'-hydroxy-2-(cyclopenten-3-yl-methyl)-6,7-benzomorphan. |
| 3-butyl-2-cyclopentene-carboxylic acid. | 5,9-diethyl-2'-hydroxy-2-(3-butyl-2-cyclopentenylmethyl)-6,7-benzomorphan. |

The 5,9-diethyl-2'-hydroxy-2-(cyclopenten - 3 - ylmethyl)-6,7-benzomorphan produced above has a melting point of 134° C. to 135° C.

Analysis.—Calculated for $C_{22}H_{32}NOCl$ (percent): C, 81.18; H, 9.60; N, 4.30. Found (percent): C, 81.08; H, 9.39; N, 4.45.

EXAMPLE 5

5,9-diethyl-2'-hydroxy-2-vinyloxyethyl-6,7-benzomorphan

A mixture of 2.45 g. of 5,9-diethyl-2'-hydroxybenzomorphan, 1.06 g. of 2-chloroethylvinylether, 1.26 g. of sodium bicarbonate and 45 ml. of ethanol is refluxed for 15 hours. The mixture is then cooled and filtered. Ethyl ether is then added to the filtrate forming a white precipitate which is filtered from the solution. The filtrate is evaporated to dryness and the residue crystallized from benzene to yield 5,9-diethyl-2'-hydroxy-2-vinyloxyethyl-6,7-benzomorphan. The product has a melting point of 234° C. to 238° C.

Analysis.—Calculated for $C_{20}H_{29}NO_2$ (percent): C, 76.15; H, 9.27; N, 4.44. Found (percent): C, 75.81; H, 8.96; N, 4.46.

Following the procedure above but using the starting material shown in Column I in place of the 2-chloroethylvinyl ether there is produced corresponding compounds shown in Column II.

| I | II |
| --- | --- |
| 2-chloroethylmethyl ether | 5,9-diethyl-2'-hydroxy-2-methoxyethyl-6,7-benzomorphan. |
| 2-chloroethylpropyl ether | 5,9-diethyl-2'-hydroxy-2-propoxyethyl6,7-benzomorphan. |

EXAMPLE 6

5,9-diethyl-2'-hydroxy-2-(spirohex-5-ylmethyl)-6,7-benzomorphan

To a stirred ice-cooled solution of 2.77 grams of spiro(3,2)hexane-5-carboxylic acid in 50 ml. of chloroform is added 2.2 grams of triethylamine followed by 2.00 grams of isobutyl chloroformate. After stirring for 15 minutes, 2.45 grams of 5,9-diethyl-2'-hydroxy-6,7-benzomorphan is added and stirring at 0° C. is continued for 4 hours. The reaction mixture is then diluted with 250 ml. of ether and washed successively with 5% aqueous hydrochloric acid, 75 ml. of water, 75 ml. of aqueous ammonia and 75 ml. of water. The organic layer is dried over magnesium sulfate, filtered and evaporated to dryness under reduced pressure to yield the appropriate 5,9-diethyl-2'-acyloxy-2-acyl-6,7-benzomorphan. The intermediate benzomorphan residue is dissolved in 50 ml. of tetrahydrofuran and this solution added dropwise to a stirred slurry of 1.5 grams of lithium aluminum hydride and 200 ml. of ethyl ether. The slurry is stirred and heated under reflux for 5 hours. Four ml. of water are then added dropwise and the precipitated inorganic salts are separated by filtration and washed with ethyl ether. The combined filtrates are evaporated to dryness under reduced pressure and the crystalline residue is recrystallized from hot ethanol. The 5,9-diethyl-2'-hydroxy-2-(spirohex-5-ylmethyl)-6,7-benzomorphan formed has a melting point of 201° C. to 203° C.

*Analysis.*—Calculated for $C_{23}N_{33}NO$ (percent): C, 81.37; H, 9.80; N, 4.12. Found (percent): C, 80.87; H, 9.78; N, 4.44.

Following the procedure above but using 2.67 grams of spiropentane carboxylic acid or 2.80 grams of spiro(3,3)-heptane-2-carboxylic acid and 3.27 grams of isobutyl chloroformate or 3.00 grams of isobutyl chloroformate respectively in place of the reactants used above and then reducing with lithium aluminum hydride, similar to the example above, there is produced 5,9-diethyl-2'-hydroxy-2-(spiropentyl-methyl) or spiro(3,3-hept-2-yl-methyl)-6,7-benzomorphan respectively.

The 5,9-diethyl-2'-hydroxy-2-(spiropentylmethyl)-6,7-benzomorphan has a melting point of 157° C. to 159° C.

*Analysis.*—Calculated for $C_{22}H_{31}NO$ (percent): C, 81.18; H, 9.30; N, 4.30. Found (percent): C, 80.85; H, 9.32; N, 4.27.

The 5,9-diethyl-2'-hydroxy-2-spiro(3,3-hept-2-yl-methyl)-6,7-benzomorphan has a melting point of 154° C. to 155° C.

*Analysis.*—Calculated for $C_{24}H_{35}NO$ (percent): C, 81.57; H, 9.98; N, 3.96. Found (percent): C, 81.95; H, 9.76; N, 3.91.

Similarly, 5,9-diethyl-2'-hydroxy-2-(spirohex-5-yl-methyl)-6,7-benzomorphan, 5,9-diethyl-2'-hydroxy-2-(spiropentylmethyl)-6,7-benzomorphan or 5,9-diethyl-2'-hydroxy-2-(spiro(3,3-hept-2-yl-methyl)-6,7-benzomorphan can be prepared by slowly adding a solution of 0.0125 mole of either spiro(3,2)hexane-5-carbonyl chloride, spiropentyl carbonyl chloride or spiro(3,3)-hept-2-yl-carbonyl chloride in 10 ml. of chloroform to a cooled solution of 0.006 mole of 5,9-diethyl-2'-hydroxy-6,7-benzomorphan in 35 ml. of dry chloroform and 5.5 ml. of dry triethylamine. The reaction mixture is then refluxed for about 12 hours, cooled, washed with dilute HCl and dilute sodium carbonate and dried over sodium sulfate. The chloroform extract is evaporated under reduced pressure to yield the appropriate 5,9-diethyl-2'-acyloxy-2-acyl-6,7-benzomorphan. The 2'-acyloxy-2-acyl intermediate is then reduced to the desired product by dissolving the intermediate in about 6.2 ml. of tetrahydrofuran and adding the tetrahydrofuran solution to a stirred suspension of 0.9 g. of lithium aluminum hydride in 10 ml. of tetrahydrofuran. The reaction mixture is refluxed for about 4 hours and the desired products isolated by a method similar to that shown in Example 6.

EXAMPLE 7

5,9-diethyl-2'-hydroxy-2-cyclopentyl-6,7-benzomorphan

A mixture of .02 mole of cyclopentyl ketone and .01 mole of 5,9-diethyl-2'-hydroxy-6,7-benzomorphan in 150 ml. of dry toluene containing molecular sieves and a trace of p-toluene sulfonic acid is stirred and heated for 12 hours under reflux using a Dean-Stark apparatus for water removal. To the resulting mixture is added 150 mg. of platinum oxide and a hydrogenation at atmospheric pressure and room temperature is carried out until .01 mole of hydrogen gas has been consumed. The reaction mixture is then filtered and the solvent removed from the reaction mixture under reduced pressure. The residue is recrystallized from methanol to yield 5,9-diethyl-2'-hydroxy-2-cyclopentyl-6,7-benzomorphan which has a melting point of 224° C. to 225° C.

*Analysis.*—Calculated for $C_{21}H_{31}NO$ (percent): C, 80.46; H, 9.97; N, 4.47. Found (percent): C, 80.30; H, 9.68; N, 4.42.

EXAMPLE 8

5,9-diethyl-2'-hydroxy-2-cyclopropyl-6,7-benzomorphan

A mixture of equimolar quatities of 5,9-diethyl-2'-hydroxy-6,7-benzomorphan, diethyl bromomalonate and sodium bicarbonate in absolute ethanol is refluxed for 5 hours. The resulting mixture is cooled, filtered and the filtrate evaporated to dryness under reduced pressure. The residue is dissolved in ether, dried over molecular sieves, filtered and the filtrate evaporated to dryness under reduced pressure. Crystallization from benzenehexane gives 5,9-diethyl-2'-hydroxy-2-biscarbethoxymethyl-6,7-benzomorphan. To a stirred solution of 5,9-diethyl-2'-hydroxy-2-biscarbomethoxymethyl-6,7-benzomorphan in either is added a solution of 2 moles of lithium aluminum hydride in ether at a rate sufficient to maintain reflux. After the addition is complete, the mixture is refluxed for 1½ hours, cooled and excess reagent decomposed by careful addition of water. Acetic acid is added to neutrality and the mixture is filtered. Evaporation of the ether filtrate leaves 5,9-diethyl-2'-hydroxy-2-(1,3-dihydroxy-2-propyl)-6,7-benzzomorphan.

Without further purification, it is dissolved in 48% hydrobromic acid and refluxed for 5 hours. The excess acid is removed by distillation under reduced pressure. Water and t-butanol are then distilled from the residue several times to complete removal of the hydrobromic acid.

The residue is crystallized from ethyl acetate to give 5,9-diethyl-2'-hydroxy-2-(1,3-dibromo-2-propyl)-6,7-benzomorphan hydrobromide. It is dissolved in 75% aqueous ethanol, 2 moles of zinc dust are added and the mixture is refluxed for 18 hours.

The alcohol is removed by distillation under reduced pressure and the resulting aqueous solution is made alkaline with a slight excess of ammonium hydroxide. The resulting mixture is extracted with benzene and the benzene extract evaporated to dryness.

The residue is crystallized from benzenehexane to yield 5,9-diethyl-2'-hydroxy-2-cyclopropyl-6,7-benzomorphan.

What is claimed is:
1. A member selected from the group consisting of compounds of the formula:

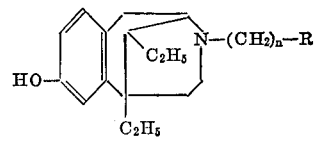

wherein:

when $n$ is the integer 1, R is alkenyloxy alkyl having from 3 to 6 carbon atoms, alkoxyl alkyl having from 2 to 6 carbon atoms, spiro alkyl having from 5 to 7 carbon atoms, cycloalkenyl having from 3 to 6 carbon atoms, alkyl cycloalkenyl, the alkyl group having from 1 to 5 carbon atoms, and the cycloalkenyl group having from 3 to 6 carbon atoms, and when $n=0$, R is cycloalkyl having from 3 to 6 carbon atoms, and non-toxic acid addition salts thereof.

2. The dextrorotatory (+) optical isomeric form of a compound according to claim 1.

3. The levorotatory (−) optical isomeric form of a compound to claim 1.

4. A compound according to claim 1 wherein R is cyclopentene-3-yl and $n=1$, thus forming 5,9-diethyl-2'-hydroxy-2-(cyclopentene-3-ylmethyl)-6,7-benzomorphan.

5. A compound according to claim 1 wherein R is 2,2,3-trimethyl-1-cyclopropenyl and $n=1$, thus forming 5,9-diethyl-2'-hydroxy-2-(2,3,3-trimethyl-cyclopropenylmethyl)-6,7-benzomorphan.

6. A compound according to claim 1 wherein R is spirohex-5-yl and $n=1$, thus forming 5,9-diethyl-2'-hydroxy-2-(spirohex-5-ylmethyl)-6,7-benzomorphan.

References Cited

UNITED STATES PATENTS

| | | | |
|---|---|---|---|
| 2,713,574 | 7/1955 | Vaughan. | |
| 3,154,554 | 10/1964 | Seeger | 260—293 |
| 3,256,678 | 5/1966 | Archer | 167—65 |
| 3,385,846 | 5/1968 | Herr et al. | 260—239 |
| 2,259,513 | 10/1941 | Barnes | 260—544 |
| 2,369,158 | 2/1945 | Milas | 260—544 |
| 2,388,657 | 11/1945 | Long | 260—544 |
| 2,710,857 | 6/1955 | Vaughan | 260—546 |
| 3,351,626 | 7/1967 | Bartels-Keith et al. | |

OTHER REFERENCES

Stock et al.: JACS, vol. 85 (1963), pp. 207–216.
Organic Chemistry, Fieser et al., D. C. Heath & Co., Boston, 1944, pp. 190–193.

HENRY R. JILES, Primary Examiner

S. D. WINTERS, Assistant Examiner

U.S. Cl. X.R.

260—294, 294.3, 463, 514, 544; 424—267